United States Patent [19]
Kuan

[11] 4,081,155
[45] Mar. 28, 1978

[54] MAN-POWERED FLYING MACHINE

[76] Inventor: Shang-Ming Kuan, 17 G. Everwell Garden, Sheung Sheng St., Tin Kong Rd., Kowloon, Hong Kong

[21] Appl. No.: 754,744

[22] Filed: Dec. 27, 1976

[51] Int. Cl.² .......................................... B64C 33/02
[52] U.S. Cl. ...................................... 244/72; 244/11; 244/64
[58] Field of Search .................. 244/4 A, 11, 22, 28, 244/64, 72, 45 R, 71; 115/25, 27, 28

[56] References Cited

U.S. PATENT DOCUMENTS

| | | | |
|---|---|---|---|
| 999,715 | 8/1911 | Gundersen | 244/11 |
| 1,031,840 | 7/1912 | Crenshaw | 244/45 R |
| 1,195,139 | 8/1916 | James | 244/22 |
| 1,326,535 | 12/1919 | Seymour | 244/45 R |
| 1,548,676 | 8/1925 | Gonzalez | 244/22 |
| 1,625,012 | 4/1927 | Worman | 244/72 |
| 1,733,033 | 10/1929 | Steigner | 244/64 |
| 2,514,639 | 7/1950 | Haack | 244/72 |

*Primary Examiner*—Trygve M. Blix
*Assistant Examiner*—Charles E. Frankfort
*Attorney, Agent, or Firm*—Hill, Gross, Simpson, Van Santen, Steadman, Chiara & Simpson

[57] ABSTRACT

A heavier-than-air structure has a delta-shaped wing and a plurality of rearwardly-directed flat fans mounted upon the rear thereof. The fans are driven in up and down arcuate oscillations by a rotating shaft carrying flap board assemblies, one board for each fan. The shaft is rotated by a bicycle-type pedal crank driven by the operator of the machine and connected to rotate the shaft by a chain and sprocket. Each flap board engages its corresponding fan forwardly of a pivot axis of the fan, driving the fan downwardly against an opposing force of an elastic band affixed to the fan aft of its pivot point. When the fan is released by continued rotation of the shaft and flap board the fan is returned upwardly by the elastic band. Fanning of ambient air at a rate of two oscillations per second gives sufficient propulsive thrust to drive the machine forwardly. The machine will rise from level ground in still air and fly unassisted for a substantial distance and return, so long as driving of the pedal crank continues.

5 Claims, 4 Drawing Figures

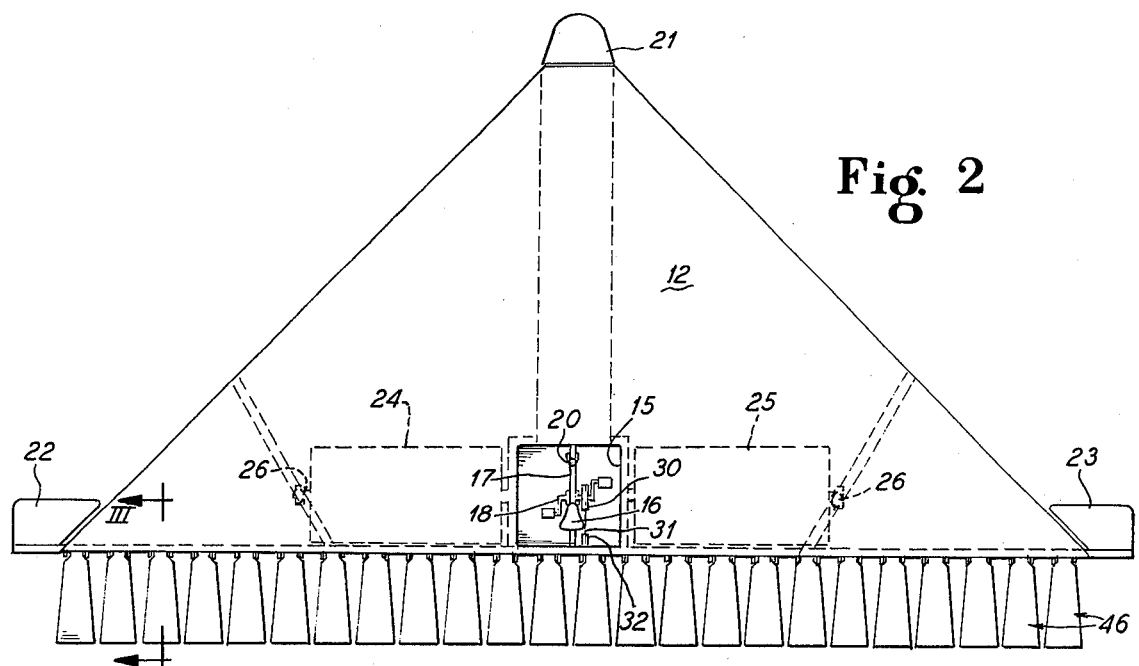
Fig. 2
Fig. 1
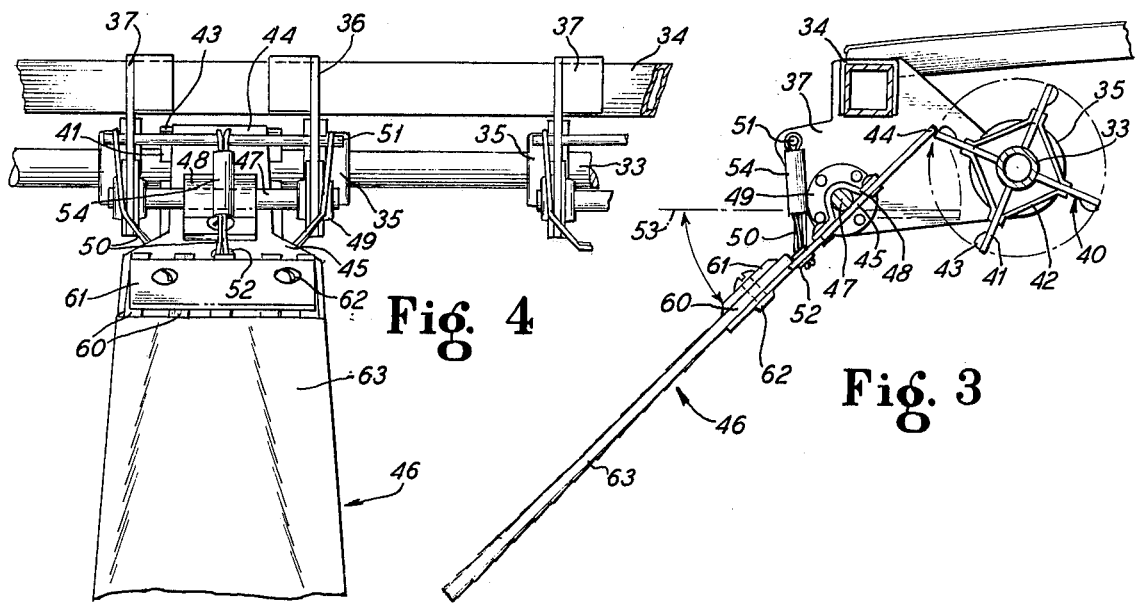
Fig. 4
Fig. 3

MAN-POWERED FLYING MACHINE

BACKGROUND OF THE INVENTION

1. Field of the Invention

The invention relates to aircraft which are adaptable to propulsion by human operators or small combustion engines.

2. Prior Art

Mankind has long been searching for a structure which will enable him to fly through the air unassisted by chemical or gaseous agents other than his own muscular power. Myriad contraptions for effecting such flight date back to Leonardo DaVinci. However, interest in such machines rapidly subsided after the success of the Wright Brothers in the early part of the twentieth century upon the advent of reliable, lightweight internal combustion engines. Early attempts at achieving man-powered flight have generally involved helicopter-type machines having large whirling blades for vertical ascent. As is now well known to those skilled in the art helicopters consume substantially greater power to sustain themselves in flight than do fixed wing aircraft of similar weight and speed. However, propulsive means for low-speed, fixed-wing flight have not been available, nor have they been developed as interest in man-powered flight has generally abated entirely.

The Royal Aeronautical Society of London has now established the Kremer Competition for design and demonstration of a man-powered flying machine, to renew interest in this field. The Kremer Competition requires that a heavier-than-air machine powered and controlled by the crew of the machine without energy storage shall take off over level ground in still air and fly a figure 8 course at least a half mile across. Ground clearance of 10 feet above the ground must be maintained at start and finish of the flight. The machine of the present invention has been designed to be flown in the Kremer Competition.

SUMMARY OF THE INVENTION

A flying machine comprises a frame which supports a fixed wing thereupon for primary lift support of the frame in flight in a forward direction. Wheels mounted at a lower portion of the frame support the machine upon and for travel along a ground surface. The machine is propelled by a plurality of substantially flat, stiff, rearwardly directed fans each supported for oscillation about an axis along the rear of the fixed wing. A shaft journalled in the frame is rotated by a crank driven by an operator of the craft. The shaft carries a plurality of flap boards extending radially therefrom, the flap boards engaging a flap plate upon each of the fans at a point forwardly of an oscillation axis thereof. Rotation of the shaft and flap boards oscillates the fans in a downward direction against an opposing force of an elastic band fixed between a fan holding board and the fan flap plate rearwardly of the oscillation axis. Continued rotation of the flap board releases the fan at a downward end of its stroke. The fan is then returned to its original position by the elastic band prior to engagement by a following portion of the board. Rotation of the shaft at a speed sufficient to oscillate each fan twice through its cycle each second gives sufficient forward thrust by reaction upon the ambient air to drive the machine forwardly at a speed sufficient to float said machine upon its fixed wing. The machine is controlled in flight by elevator and aileron tabs affixed to the wing, together with an auxiliary wing mounted separately from the main wing and pivotable with respect to the main wing.

BRIEF DESCRIPTION OF THE DRAWINGS

FIG. 1 is a side elevational view of the flying machine of the present invention.

FIG. 2 is a top plan view of the flying machine.

FIG. 3 is a side view of a fan actuation assembly, on line III—III of FIG. 2, partially broken away and partially in section.

FIG. 4 is an enlarged perspective view from the rear of a fan actuation assembly.

DESCRIPTION OF THE PREFERRED EMBODIMENT

A flying machine built in accordance with the principles of the present invention is shown generally at 10 in FIG. 1. The machine has a frame 11 extending beneath a cambered main wing 12, the frame 11 supporting and rigidifying the wing in vertical and transverse directions. Upon a lower part of the frame a plurality of wheels 13 are mounted for rotation as the machine 10 rolls along a surface 14 for take off and landing. The wing 12 carries only a small load per square foot and is constructed of a sheet form material which forms a desired air foil shape upon movement through the air, much like a boat sail.

Mounted within the frame 11, at a rear portion thereof and beneath a cut out portion in the wing 12 is an operator's area having a seat 16 mounted upon an upper bar 17 and a bicycle-type pedal-crank assembly 18 mounted upon a lower bar 19. The pedals may have toe clips as are common on racing bicycles to permit application of force to each pedal upon the up stroke thereof as well as the downward stroke. A control stick 20 is mounted upon the upper bar 17 within control of the operator; the stick 20 is connected to an elevator tab 21 at the front of the wing 12 and to left and right aileron control tabs 22 and 23, respectively, at either side of the main wing 12. Control connection by wires and bell cranks is conventional in the art and is omitted to preserve clarity of the drawings. Mounted on either side of the operator's area is a pair of auxiliary wings 24, 25 pivotally mounted upon the frame 11 in bearings 26 for making gross adjustments of the attitude of the machine 10 in flight. The seat 15 and crank means 18 conveniently are bicycle components, which are readily available and are both light and strong.

Power from the crank 18 is transmitted by means of a sprocket wheel 30 rotating with the crank, through a bicycle chain loop 31 and to a driven sprocket 32 which is mounted upon a tubular crank shaft 33 just beneath the wing 12 at a rear portion thereof. As best shown in FIGS. 3 and 4, the crank shaft 33 is mounted for rotation adjacent a box beam 34 which stiffens the rear part of the frame 11 in the transverse direction. The shaft 33 is supported in bearings 35 which are in turn carried by fan holding boards 36, 37 mounted upon the box beam 34 in pairs at intervals therealong. The holding boards 36 and 37 are mirror images of one another and form left and right side members for supporting the propulsive means for the flying machine 10.

The crank shaft 33 carries at intervals, between each pair of holding boards 36, 37, flap board assemblies 40 irrotatably thereon. The assembly 40 comprises a number of individual flap boards 41 attached radially outwardly to the shaft 33 and supported in relation to one another by reinforcing struts 42. At the radially outward end of each flap board 41 a contact tab 43 is arranged to engage an end 44 of a flap plate 45 affixed to each fan 46. The fan plate 45 is mounted upon a pivot shaft 47 by means of a bracket 48 extending thereabout. The pivot shaft 47 is rotatable in bearings 49 carried by the holding boards 36 and 37.

Rearwardly of the pivot shaft 47 a plurality of elastic bands 50 are engaged with the flap plate 45 and are anchored to a bar 51 which is carried by the holding boards 36 and 37 and extend transversely of each as shown in FIG. 4. The elastic bands 50 engage a center of the bar 51 between the holding boards 36 and 37 and pass through the flap plate 45 at a grommet 52. Half of the bands 50 are then passed under the flap plate 45 and engage with the bar 51 outwardly of the holding board 37, and the other half are engaged with the bar 51 outwardly of the holding board 36. The elastic bands 50 exert an upward force on the flap plate 45 rearwardly of the pivot shaft 47, urging the fan 46 to an upward position depicted by the line 53 in FIGS. 1 and 3.

An adjustment tube 54 is engaged about the elastic bands 50 between the grommet 52 and the shaft 51. When the fan is at the position 53 the adjustment tube 54 prevents the fan from rising above its upper position 53 and the forward end 44 from swinging downwardly and out of an engagement position with the flap board assembly 40. The length of the tube adjustment 54 between the bar 51 and the flap plate 45 or grommet 52 therein fixes the position of the line 53.

The fan 46 has a body formed by a number of flat, stiff spokes 60 of a material such as bamboo. The spokes 60 are clamped to the rearward end of the flap plate 45 by a plate 61 extending across the width of the flap plate 45 and affixed thereto by convenient means such as screws 62. The spokes 60 are arranged to form a horizontally-expanding fan shape as shown in FIGS. 2 and 4. The spokes 60 are covered with a light, impervious sheet form material 63 such as nylon or treated paper. Such material 63 is wrapped about the spokes 60 and sealed thereto.

In operation, a person mounts himself within the space formed by the cut out 15 in the surface of the wing 12, straddling the seat 16 and engaging the pedals of the crank assembly 18 with his feet. Cranking the crank 18 rotates the sprocket 32 affixed to the crank shaft 33. Rotation of the crank shaft 33 rotates the flap board assemblies 40 all along the rear part of the wing 12 adjacent the beam 34. Rotation of the flap assemblies 40 causes individual flap boards 41 to engage via their contact pads 43 undersurfaces of the forward edges 44 of the flap plates 45 of the fans 46. The rotational angular positions of the flap boards 41 are preferably staggered along the length of the shaft 33, much like the connecting rod bearings of a crank shaft in a piston engine where the engine has five or more cylinders. Such staggering evens out the force peaks required to effect a complete revolution of the shaft 33 and increases the efficiency of the fans 46 in directing air rearwardly. Each flap board 41 will upon engagement with a flap plate 44 via its pad 43 move its corresponding fan 46 from its upward position 53 to a downward position as shown in FIG. 3 and depicted by line 64 in FIG. 1. Further rotation of the flap board assembly 40 moves the flap board 41 past and out of engagement with the end 44 of the flap plate 45, permitting the now-stretched elastic bands 50 acting upon the flap plate 45 rearwardly of the pivot axis 47 to return the fan 46 rapidly to the upward position 53.

Rotation of the crank shaft 33 by the crank assembly 18 producing two downstrokes per second on twenty-four such fans 46 produces sufficient propulsive force to drive the machine 10 forwardly to lift from the ground 14 and to fly the course of the Kremer Competition or any such utilitarian or recreational course. The operator controls the altitude of the machine 10 in flight by operating the control stick 20 as in a conventional light aircraft to move the tabs 21, 22, and 23. Any convenient means may be adopted for adjusting the auxiliary wings 24 and 25.

Although various minor modifications to the layout and structure of the flying machine and propulsive means of the present disclosure will be suggested by those versed in the art, it should be understood that I wish to embody within the scope of the patent warranted hereon all such modifications as reasonably and properly come within the scope of my contribution to the art.

I claim as my invention:

1. A flying machine having a frame, a wing affixed to said frame and sufficient to support said machine and an operator in forward flight at a flight speed, control means for guiding said machine in flight, ground support means for supporting said machine upon a ground surface, and propulsion means, said propulsion means comprising:

a plurality of stiff, flat fans oscillatably mounted upon said frame on an axis of oscillation transverse to the forward flight direction; and
    means for oscillating said fans in up and down arcuate strokes, said means comprising,
        a rotatable crank shaft extending parallel to said axis,
        a plurality of flap boards affixed to said crank shaft for rotation therewith, each of said flap boards extending radially of said crank shaft and engaging a corresponding one of said fans to oscillate said fan from one end of its said up and down arcuate stroke to an opposite end; and
    an elastic band extending from each of said fans to a fixed point of said frame and said bands urging said fans to said one end of their arcuate strokes,
whereby ambient air about said machine is directed rearwardly of said machine by movement of said fans with sufficient force to propel said machine forwardly in reaction thereto at said flight speed.

2. A flying machine as defined in claim 1, wherein said crank shaft is rotated by an operator-driven crank assembly affixed to said machine frame, such rotation having a speed sufficient to give at least two up and down oscillations of said fans each second.

3. A flying machine having a frame, a wing affixed to said frame and sufficient to support said machine and an operator in forward flight at a flight speed, control means for guiding said machine in flight, ground support means for supporting said machine upon a ground surface, and propulsion means, said propulsion means comprising:

a plurality of stiff, flat fans oscillatably mounted upon said frame on an axis of oscillation transverse to the forward flight direction; and
    means for oscillating said fans in up and down arcuate strokes, said means for oscillating said fans comprising, a rotatable crank shaft extending parallel to said axis, a plurality of flap boards affixed to said crank shaft for rotation therewith, each of said flap boards extending radially of said crank shaft and engaging a corresponding one of said fans to oscillate said fan from one end of its said up and down arcuate stroke to an opposite end; and an elastic band extending from each of said fans to a fixed point on said frame and said bands urging said fans to said one end of their arcuate strokes, and each said elastic band being enclosed along a portion of its length between said fan and said frame by an oscillation stroke angle adjustment tube, said tube abutting between said fan and said frame to limit travel of said corresponding fan toward said opposite end of its arcuate stroke, the length of said tube determining a limit to said stroke, whereby ambient air about said machine is directed rearwardly of said machine by movements of said fans with sufficient force to propel said machine forwardly in reaction thereto at said flight speed.

4. A flying machine comprising a frame, a wing supported upon said frame for primary lift support of said frame in flight in a forward direction, wheel means for machine support upon a ground surface, and propulsion means affixed to said frame, said propulsion means comprising:

a crank shaft journaled in said frame on an axis transverse to the forward direction of the machine;

a crank assembly for rotating said crank shaft about said axis in a rotational direction;

a plurality of flap boards attached to said crank shaft for rotation therewith, said boards extending radially from said crank shaft;

a plurality of substantially flat, stiff, rearwardly-directed fan members each supported for oscillation about an oscillation axis parallel to said crank shaft axis, each said fan member having a flap plate integrally affixed thereto and extending forwardly of said oscillation axis for periodic engagement with and movement toward a first position by a corresponding one of said flap boards, each said fan member further having an elastic means affixed to a portion thereof rearwardly of said oscillation axis and arranged to releasably hold said fan in a second position oscillatably opposed to said first position, and said fan members having on rearward portions thereof broad, fan-like surface areas for engaging and directing ambient air in a rearward direction from said machine, whereby rotation of said crank shaft by said crank assembly rotates the flap boards into engagement against the flap plates of the fan members, oscillating each said fan in a first movement from its said second position to its said first position, whereupon each said flap board releases its corresponding fan member to be returned to its said second position in a second movement by said elastic means, said ambient air being driven rearwardly of said machine by said oscillating movements with sufficient net force imparted thereto to propel said flying machine forwardly in flight through said air upon said wing.

5. A man-powered airplane vehicle comprising:

a triangularly shaped main wing comprising an airfoil having lift surfaces providing lift force when moved in a forward direction, one apex of the triangularly shaped wing being disposed forwardly and the other two disposed at opposite side extremities, selectively movable control surface means comprising an elevator tab at the front apex and aileron tabs at the side apices of the main wing, oscillating means for imparting forward thrust to the vehicle comprising a plurality of spaced apart stiff, flat fan elements operatively engageably by a rotatable crank shaft and disposed in a row along the rear edge of the triangularly shaped wing and constructed for moving in up and down arcuate strokes, and a bicycle pedal and crank assembly foot operated by the operator to rotatably drive the crank shaft and oscillate the fan elements, whereby the vehicle can take-off unassisted and fly above the ground under the power and control of a single human operator.

* * * * *